(12) United States Patent
Chan et al.

(10) Patent No.: US 11,233,458 B2
(45) Date of Patent: Jan. 25, 2022

(54) SYSTEM AND METHOD FOR IMPROVING CONVERTER EFFICIENCY

(71) Applicant: SCHNEIDER ELECTRIC IT CORPORATION, Foxboro, MA (US)

(72) Inventors: Pin-Chieh Chan, Bade Section Taoyuan (TW); Huang-Yun Chen, New Taipei (TW); Chun Chih Fu, New Taipei (TW)

(73) Assignee: SCHNEIDER ELECTRIC IT CORPORATION, Foxboro, MA (US)

( * ) Notice: Subject to any disclaimer, the term of this patent is extended or adjusted under 35 U.S.C. 154(b) by 0 days.

(21) Appl. No.: 16/874,803

(22) Filed: May 15, 2020

(65) Prior Publication Data
US 2020/0366212 A1 Nov. 19, 2020

Related U.S. Application Data

(60) Provisional application No. 62/849,200, filed on May 17, 2019.

(51) Int. Cl.
*H02M 3/335* (2006.01)
*H02M 1/00* (2006.01)

(52) U.S. Cl.
CPC ... *H02M 3/33576* (2013.01); *H02M 3/33592* (2013.01); *H02M 1/0009* (2021.05)

(58) Field of Classification Search
CPC ......... H02M 3/33576; H02M 3/33592; H02M 1/0009; H02M 2001/0009
See application file for complete search history.

(56) References Cited

U.S. PATENT DOCUMENTS

| 9,929,663 | B1* | 3/2018 | Babazadeh | ....... H02M 3/33592 |
| 2017/0063246 | A1* | 3/2017 | Kong | ................ H02M 3/33592 |
| 2019/0058450 | A1* | 2/2019 | Jun | ........................ G01R 19/04 |

OTHER PUBLICATIONS

Dianbo Fu et al: "A Novel Driving Scheme for Synchronous Rectifiers in LLC Resonant Converters", IEEE Transactions on Power Electronics, Institute of Electrical and Electronics Engineers, USA, vol. 24, No. 5, May 1, 2009 (May 1, 2009), pp. 1321-1329, XP011256763, ISSN: 0885-8993.
Extended European Search Report from corresponding European Application No. 20175070.0 dated Sep. 21, 2020.

(Continued)

*Primary Examiner* — Jue Zhang
(74) *Attorney, Agent, or Firm* — Lando & Anastasi, LLP

(57) ABSTRACT

According to aspects of the disclose, a converter system includes a primary-side circuit configured to be coupled to an energy source, a secondary-side circuit configured to be coupled to a load, the secondary-side circuit including an energy storage device and at least one switching device configured to control a load current provided by the energy storage device to the load, and a controller configured to be coupled to the primary-side circuit and the secondary-side circuit, the controller being further configured to determine a parameter indicative of an energy level of the energy storage device, and control, based on the parameter indicating that the energy level of the energy storage device is below a discharge energy level, the at least one switching device to be in an open and non-conducting position.

15 Claims, 11 Drawing Sheets

(56) References Cited

OTHER PUBLICATIONS

Mohammadi Mehdi et al: "Synchronous Rectification of LLC Resonant Converters Using Homopolarity Cycle Modulation", IEEE Transactions on Industrial Electronics, IEEE Service Center, Piscataway, NJ, USA, vol. 66, No. 3, Mar. 1, 2019 (Mar. 1, 2019), pp. 1781-1790, XP011693830, ISSN: 0278-0046, DOI: 10.1109/TIE.2018.2840493 [retrieved on Oct. 31, 2018].

Weiyi Feng et al: "Digital implementation of driving scheme for synchronous rectification in LLC resonant converter". Energy Conversion Congress and Exposition (ECCE). 2010 IEEE, IEEE, Piscataway, NJ, USA, Sep. 12, 2010 (Sep. 12, 2010), pp. 256-263, XP031787246, ISBN: 978-1-4244-5286-6.

Yamamoto K et al: "Bidirectional DC-DC Converter with Full-bridge/ Push-pull circuit for Automobile Electric Power Systems", Power Electronics Specialists Conference, 2006. PESC '06. 37th IEEE Jeju, Korea, Jun. 18-22, 2006, Piscataway, NJ, USA, IEEE, Jun. 18, 2006 (Jun. 18, 2006), pp. 1-5, XP010945070, DOI 10.1109/PESC.2006.1711776 ISBN: 978-0-7803-9716-3.

* cited by examiner

SYSTEM AND METHOD FOR IMPROVING CONVERTER EFFICIENCY

CROSS-REFERENCE TO RELATED APPLICATIONS

This application claims priority under 35 U.S.C. § 119(e) to U.S. Provisional Application Ser. No. 62/849,200 titled "SYSTEM AND METHOD FOR IMPROVING CONVERTER EFFICIENCY," filed on May 17, 2019, which is hereby incorporated by reference in its entirety.

BACKGROUND

1. Field of the Disclosure

At least one example in accordance with the present disclosure relates generally to power converters.

2. Discussion of Related Art

The use of power devices, such as power converters, is generally known. Power converters are configured to convert power from one state to another. For example, a resonant converter is one example of a power converter that may be configured to convert power from one state to another. A resonant converter includes capacitors and inductors tuned to resonate at a desirable frequency, and may convert direct current power into output power for provision to a load.

SUMMARY

According to at least one example of the disclosure, a converter system is provided including a primary-side circuit configured to be coupled to an energy source, a secondary-side circuit configured to be coupled to a load, the secondary-side circuit including an energy storage device and at least one switching device configured to control a load current provided by the energy storage device to the load, and a controller configured to be coupled to the primary-side circuit and the secondary-side circuit, the controller being further configured to determine a parameter indicative of an energy level of the energy storage device, and control, based on the parameter indicating that the energy level of the energy storage device is below a discharge energy level, the at least one switching device to be in an open and non-conducting position.

In at least one example, the converter system further includes a transformer having a primary coil coupled to the primary-side circuit and at least one secondary coil coupled to the secondary-side circuit, wherein the energy storage device includes the at least one secondary coil. In some examples, the at least one secondary coil is configured to provide an output current including the load current. In various examples, the converter system includes a current detection circuit configured to detect a value of an output current provided by the at least one secondary coil.

In at least one example, the controller is further configured to determine whether a value of an output current is below a current value corresponding to the discharge energy level of the energy storage device, and control the at least one switching device to be in the open and non-conducting position responsive to determining that the value of the output current is below the current value corresponding to the discharge energy level of the energy storage device. In some examples, the parameter includes a value of an output current provided by the at least one secondary coil. In various examples, the primary-side circuit further comprises a plurality of switching devices configured to control an input current through the primary coil. In at least one example, the controller is further configured to determine a phase angle between the plurality of switching devices, and determine a duty cycle of the at least one switching device based on the phase angle between the plurality of switching devices. In some examples, the parameter includes the phase angle between the plurality of switching devices.

According to another example of the disclosure, a non-transitory computer-readable medium storing thereon sequences of computer-executable instructions for controlling a converter system having a primary-side circuit, a secondary-side circuit, an energy storage device, and at least one switching device configured to control a load current provided by the energy storage device to a load is provided, the sequences of computer-executable instructions including instructions that instruct at least one processor to determine a parameter indicative of an energy level of the energy storage device, and control, based on the parameter indicating that the energy level of the energy storage device is below a discharge energy level, the at least one switching device to be in an open and non-conducting position.

In at least one example, the converter system further comprises a transformer having a primary coil coupled to the primary-side circuit and at least one secondary coil coupled to the secondary-side circuit, the energy storage device including the at least one secondary coil, and the at least one secondary coil being configured to provide an output current including the load current, and wherein the instructions further instruct the at least one processor to detect a value of the output current provided by the at least one secondary coil. In some examples, the instructions are further configured to instruct the at least one processor to determine whether a value of an output current is below a current value corresponding to the discharge energy level of the energy storage device, and control the at least one switching device to be in the open and non-conducting position responsive to determining that the value of the output current is below the current value corresponding to the discharge energy level of the energy storage device.

In various examples, the converter system further comprises a transformer having a primary coil coupled to the primary-side circuit and at least one secondary coil coupled to the secondary-side circuit, the energy storage device including the at least one secondary coil, and wherein the parameter includes a value of an output current provided by the at least one secondary coil. In some examples, the converter system further comprises a transformer having a primary coil coupled to the primary-side circuit, the primary-side circuit further comprising a plurality of switching devices configured to control an input current through the primary-side circuit, and at least one secondary coil coupled to the secondary-side circuit, and wherein the instructions further instruct the at least one processor to determine a phase angle between the plurality of switching devices, and determine a duty cycle of the at least one switching device based on the phase angle between the plurality of switching devices. In various examples, the parameter includes the phase angle between the plurality of switching devices.

According to another example of the disclosure, a method of controlling a converter system having a primary-side circuit, a secondary-side circuit, an energy storage device, and at least one switching device configured to control a load current provided by the energy storage device to a load is provided, the method comprising determining a parameter indicative of an energy level of the energy storage device, and controlling, based on the parameter indicating that the energy level of the energy storage device is below a discharge energy level, the at least one switching device to be in an open and non-conducting position.

In at least one example, the converter system further comprises a transformer having a primary coil coupled to the primary-side circuit and at least one secondary coil coupled to the secondary-side circuit, the energy storage device including the at least one secondary coil, and the at least one secondary coil being configured to provide an output current including the load current, and wherein the method further comprises detecting a value of the output current provided by the at least one secondary coil. In various examples, the method further comprises determining whether a value of an output current is below a current value corresponding to the discharge energy level of the energy storage device, and controlling the at least one switching device to be in the open and non-conducting position responsive to determining that the value of the output current is below the current value corresponding to the discharge energy level of the energy storage device, wherein the parameter includes the value of the output current.

In various examples, the converter system further comprises a transformer having a primary coil coupled to the primary-side circuit, the primary-side circuit further comprising a plurality of switching devices configured to control an input current through the primary-side circuit, and at least one secondary coil coupled to the secondary-side circuit, and the method further comprises determining a phase angle between the plurality of switching devices, and determining a duty cycle of the at least one switching device based on the phase angle between the plurality of switching devices. In at least one example, the parameter includes the phase angle between the plurality of switching devices.

According to at least one aspect of the present disclosure, a converter system is provided including a primary side configured to be coupled to an energy source, a secondary side configured to be coupled to a load, the secondary side including at least one switching device configured to control an output current provided to the load, and a controller configured to be coupled to the primary side and the secondary side, the controller being further configured to determine the output current provided to the load, and control, responsive to determining that the output current is zero, the at least one switching device to be in an open and non-conducting position.

According to another aspect of the present disclosure, a method of operating a converter including a primary side and a secondary side, the secondary side configured to be coupled to a load and including at least one switching device configured to control an output current provided to the load, the method including determining the output current provided to the load, and controlling, responsive to determining that the output current is zero, the at least one switching device to be in an open and non-conducting position.

According to another aspect of the present disclosure, a converter system is provided including a primary side configured to be coupled to an energy source, the primary side including at least two switching devices, a secondary side configured to be coupled to a load, the secondary side including at least one switching device configured to control an output current provided to the load, and a controller configured to be coupled to the primary side and the secondary side, the controller being further configured to determine a duty cycle phase angle of the at least two switching devices, determine, based on the duty cycle phase angle, a duty cycle of the at least one switching device, the duty cycle being longer than the duty cycle phase angle, and control the at least one switching device based on the duty cycle.

According to another aspect of the present disclosure, a method of operating a converter including a primary side including at least two switching devices, and a secondary side configured to be coupled to a load and including at least one switching device configured to control an output current provided to the load, the method including determining a duty cycle phase angle of the at least two switching devices, determining, based on the duty cycle phase angle, a duty cycle of the at least one switching device, the duty cycle being longer than the duty cycle phase angle, and controlling the at least one switching device based on the duty cycle.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1A:
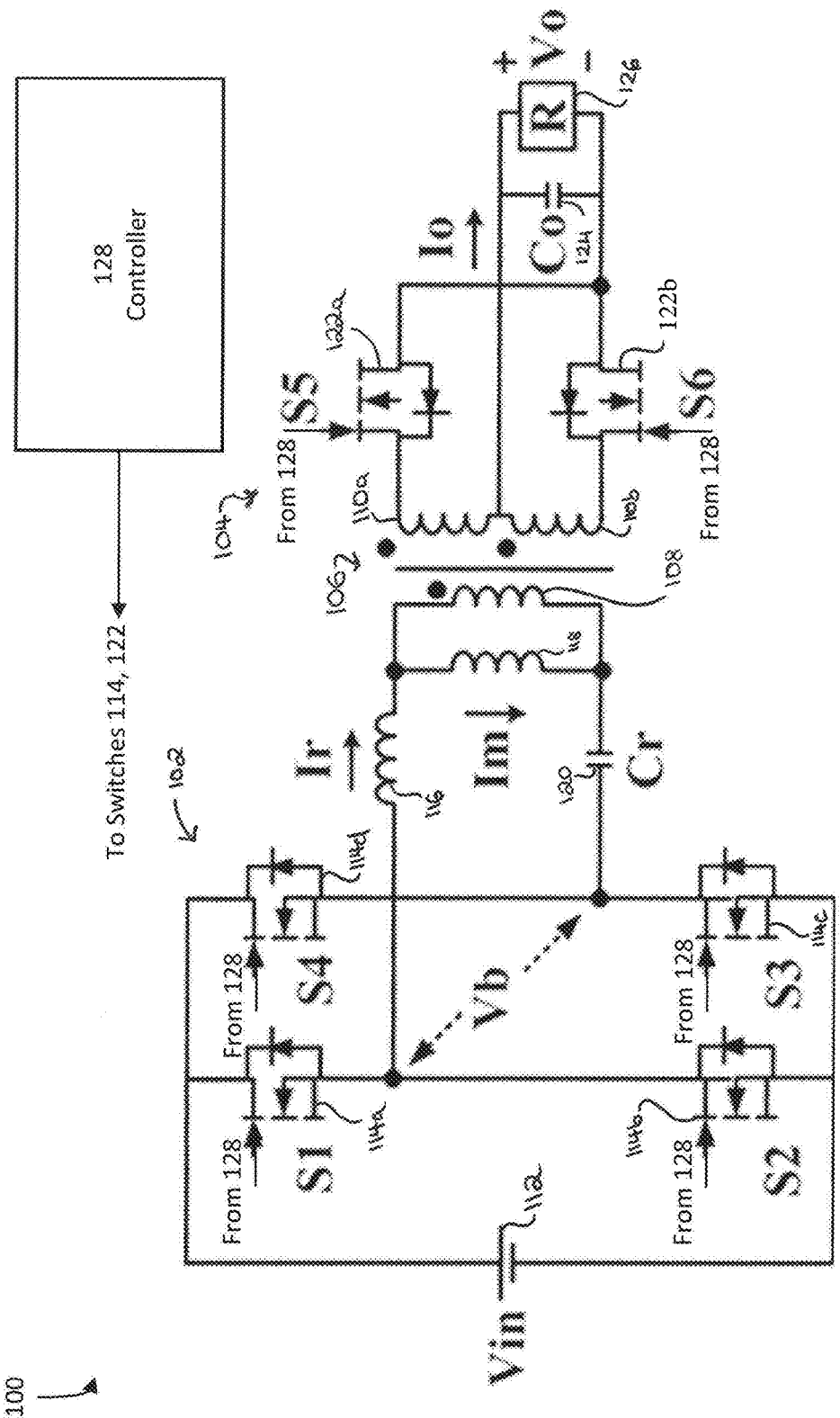
FIG. 1A illustrates a circuit diagram of a converter according to an example.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are no intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

Power converters are configured to convert power from one state to another. An example of a power converter is a resonant converter, which includes capacitors and inductors tuned to a particular resonant frequency. In one example, a resonant converter may convert power received from a direct current (DC) power source into output power.

In practical implementations, a resonant converter is not perfectly efficient. For example, power may be consumed by the resonant converter in converting DC power received from the DC power source into output power. It may be advantageous to increase the efficiency of a resonant converter by reducing an amount of power consumed by the resonant converter in converting input power into output power.

As discussed above, certain resonant converters include capacitors and inductors. For example, resonant converters may include a transformer having a primary coil and at least one secondary coil. A magnetic field may be induced in the primary coil by an energy source, such as a battery. A magnetic field induced in the primary coil induces a magnetic field in the at least one secondary coil, which induces a current through the at least one secondary coil. For example, the induced current may be discharged to a load through a switching device. The switching device may control the induced current by modulating a state (that is, open and non-conducting or closed and conducting) of the switching device.

In some converters, a secondary coil may be prevented from fully discharging stored energy to a load. For example, a switching device configured to control the induced current may be opened before the secondary coil has fully discharged. The remaining energy stored by the secondary coil after the storage device is opened may be wasted and thereby lower the efficiency of the converter. An efficiency of a resonant converter may therefore be increased by enabling one or more secondary coils in a resonant converter to fully discharge before a switching device connected thereto is opened.

In a first example, a current detected by a current detection circuit is implemented to determine an output current provided to a load by an energy storage device (for example, a secondary coil of a transformer) via a switching device. As the energy storage device discharges, the output current provided by the energy storage device via the switching device may decrease. That is, a remaining energy level of the energy storage device may decrease in proportion to the discharge current. The switching device is maintained in a closed and conducting position until a determination is made by the current detection circuit that the output current is at or below a selected current value, at which point the switching device is opened. The selected current value may correspond to a substantially discharged energy level of the energy storage device. Thus, the efficiency of the resonant converter may be improved by ensuring that a desired amount of energy stored by the energy storage device is discharged to a load.

In a second example, a control method is implemented to operate a switching device configured to control an output current provided by an energy storage device to a load. The control method may include identifying a parameter corresponding to a duty cycle of the switching device. An optimal value of the parameter corresponding to the duty cycle is determined, where the optimal value may correspond to maintaining the switching device in a closed and conducting position until the energy storage device has substantially discharged. The switching device is thus controlled pursuant to the parameter corresponding to the duty cycle. Thus, the efficiency of the resonant converter may be improved by ensuring that energy stored by the energy storage device is fully discharged to a load.

FIG. 1A illustrates a resonant converter 100. The resonant converter 100 may be implemented in a power device. In one example, the resonant converter 100 may be implemented in a DC power supply configured to be coupled to a load, and may be configured to convert DC power in a first state into DC power in a second state.

The resonant converter 100 includes a primary-side circuit 102 coupled to a secondary-side circuit 104 via a transformer 106. The transformer 106 includes a primary coil 108, a first secondary coil 110a, and a second secondary coil 110b. The primary-side circuit 102 includes components coupled to the primary coil 108, which may include an energy source 112, a first switching device 114a, a second switching device 114b, a third switching device 114c, a fourth switching device 114d, a first inductor 116, a second inductor 118, and a capacitor 120, and may include the primary coil 108. The secondary-side circuit 104 includes components coupled to the secondary coils 110a, 110b, which may include a fifth switching device 122a, a sixth switching device 122b, and a capacitor 124, and may include the first secondary coil 110a and the second secondary coil 110b.

In some embodiments, the primary-side circuit 102 may be coupled to the energy source 112, but may not include the energy source 112. The secondary-side circuit 104 may be configured to be coupled to a load 126. In one example, the resonant converter 100 is coupled to a controller 128 configured to control the switching devices 114, 122. In another example, the resonant converter 100 includes the controller 128.

The resonant converter 100 is configured to receive input power from the energy source 112, convert the input power into output power, and provide the output power to the load 126. The controller 128 controls operation of the resonant converter 100 by modulating a respective state of each of the switching devices 114, 122. Power provided to the transformer 106 may be controlled by transmitting pulse width modulation (PWM) signals from the controller 128 to control connections (for example, gates) of the switching devices 114, 122.

Figure 2A:
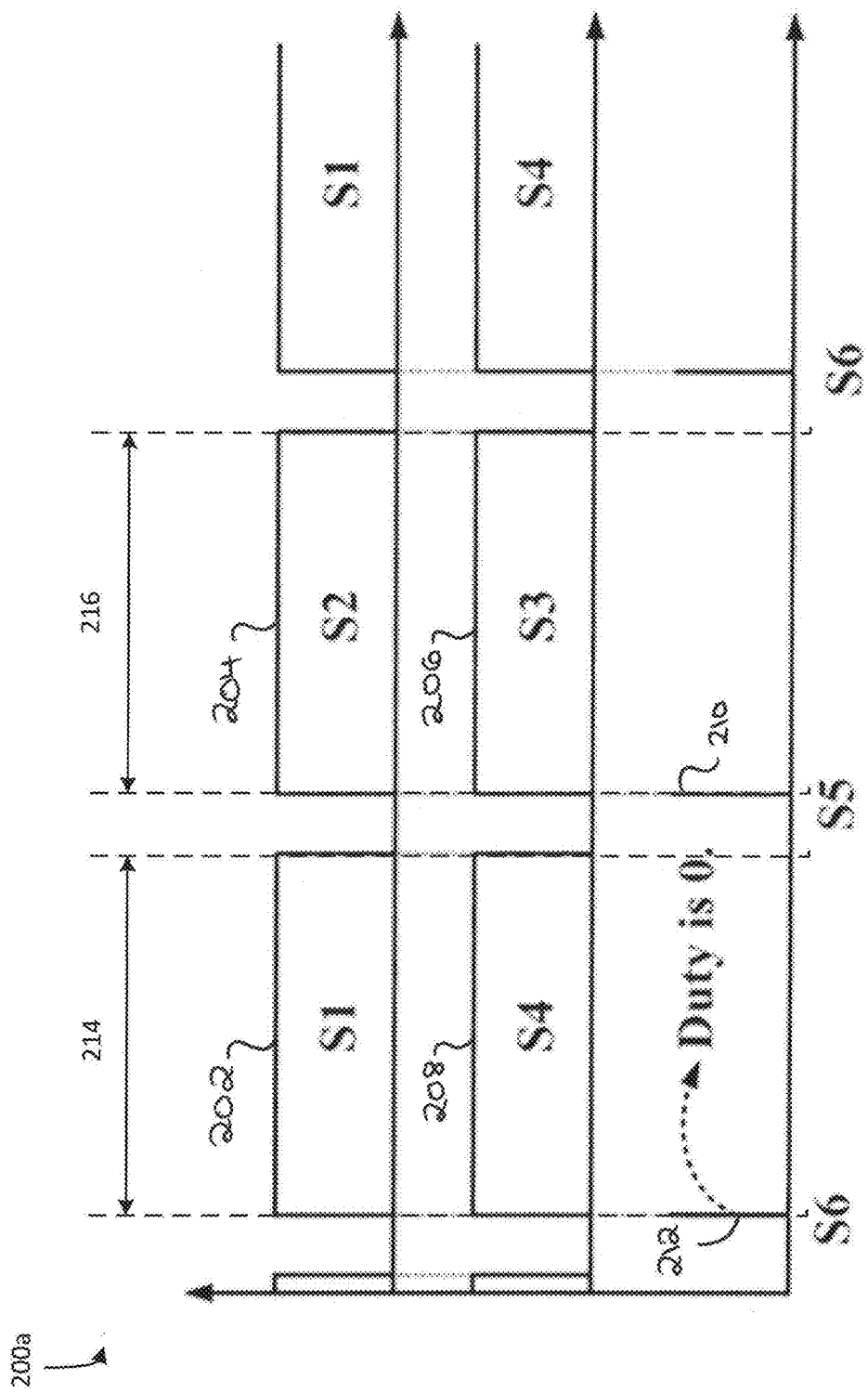
FIG. 2A illustrates a first timing diagram according to an example.

FIG. 2A illustrates a timing diagram 200a of PWM signals 202-212 provided by the controller 128 to the switching devices 114, 122 while the resonant converter 100 is in a standby mode of operation according to an example. The timing diagram 200a includes a first PWM signal 202, a second PWM signal 204, a third PWM signal 206, a fourth PWM signal 208, a fifth PWM signal 210, and a sixth PWM signal 212. The first PWM signal 202 is provided to the first switching device 114a, the second PWM signal 204 is provided to the second switching device 114b, the third PWM signal 206 is provided to the third switching device 114c, the fourth PWM signal 208 is provided to the fourth switching device 114d, the fifth PWM signal 210 is provided to the fifth switching device 122a, and the sixth PWM signal 212 is provided to the sixth switching device 122b. In one example, a logical HIGH level of the signals 202-212 controls the respective switching devices to be in a closed and conducting state, and a logical LOW level of the signals 202-212 controls the respective switching devices to be in an open and non-conducting state.

The resonant converter 100 may be in the standby mode of operation where the load 126 is not drawing power. Thus, no appreciable amount of power is provided to the load 126 while the resonant converter 100 is in the standby mode of operation. As illustrated by the timing diagram 200a, the PWM signals 202, 208 are simultaneously HIGH during a first period of time 214, the PWM signals 204, 206 are simultaneously HIGH at during a second period of time 216, and the PWM signals 210, 212 are LOW during both the first period of time 214 and the second period of time 216.

During the first period of time 214, therefore, the first switching device 114a and the fourth switching device 114d are in a closed and conducting position, and the second switching device 114b and the third switching device 114c are in an open and non-conducting position. Thus, no conductive path through which power may be provided from the energy source 112 to the transformer 106 is present. Furthermore, the switching devices 122 remain in an open and non-conducting position.

After the first period of time 214, the second period of time 216 begins. During the second period of time 216, the first switching device 114a and the fourth switching device 114d are in an open and non-conducting position, and the second switching device 114b and the third switching device 114c are in a closed and conducting position. Thus, no conductive path through which power may be provided from the energy source 112 to the transformer 106 is present. Furthermore, the switching devices 122 remain in an open and non-conducting position.

After the second period of time 216, the PWM signals 202, 208 are again simultaneously HIGH as during the first period of time 214. A cycle is established whereby the PWM signals 202, 208 are simultaneously HIGH, followed by the PWM signals 204, 206 being simultaneously HIGH, and so forth, without any appreciable power being provided to the load 126 as long as the resonant converter 100 is in the standby mode of operation.

Figure 2B:
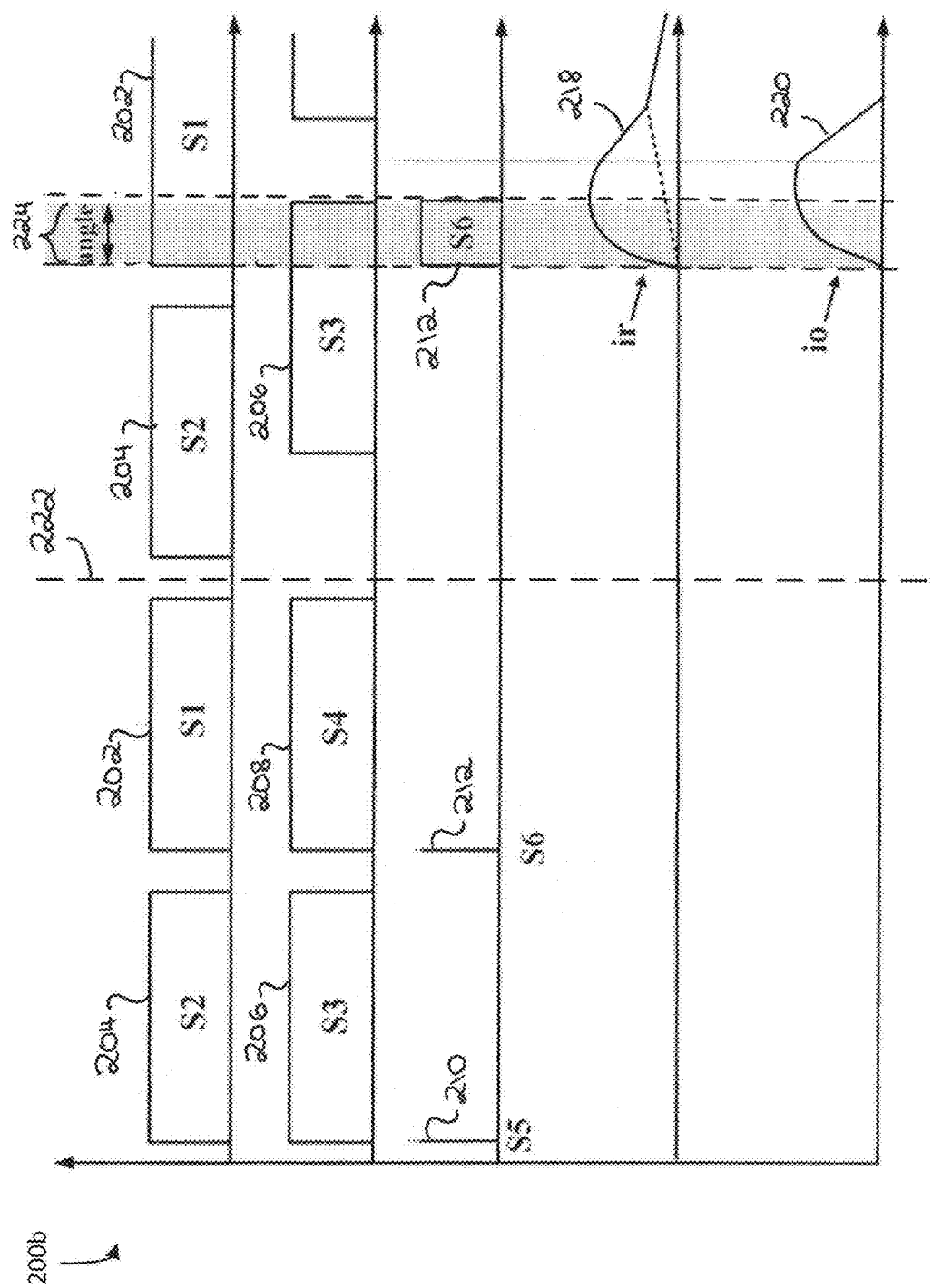
FIG. 2B illustrates a second timing diagram according to an example.

FIG. 2B illustrates a timing diagram 200b of PWM signals provided by the controller 128 while the resonant converter 100 transitions from the standby mode of operation to an active mode of operation according to an example. The resonant converter 100 transitions from the standby mode of operation to the active mode of operation at a first time 222. Before the first time 222, the resonant converter 100 is in a standby mode of operation. After the first time 222, the resonant converter 100 transitions to the active mode of operation. The timing diagram 200b includes a primary-side current trace 218 indicative of a current output by the energy source 112, and a secondary-side current trace 220 indicative of a current provided to the load 126.

As the resonant converter 100 transitions to the active mode of operation after the first time 222, the second PWM signal 204 is no longer entirely in phase with the third PWM signal 206. The third PWM signal 206 is delayed relative to the second PWM signal 204 and overlaps temporally with (that is, is at a logical HIGH level simultaneously with) the first PWM signal 202, the overlap being indicated by a phase angle 224. A rising edge of the sixth PWM signal 212 coincides with a rising edge of the first PWM signal 202, and a falling edge of the sixth PWM signal 212 coincides with a falling edge of the third PWM signal 206. Similarly, a rising edge of the fifth PWM signal 210 coincides with a rising edge of the second PWM signal 204, and a falling edge of the fifth PWM signal 210 coincides with a falling edge of the fourth PWM signal 208 (not illustrated).

Figure 1B:
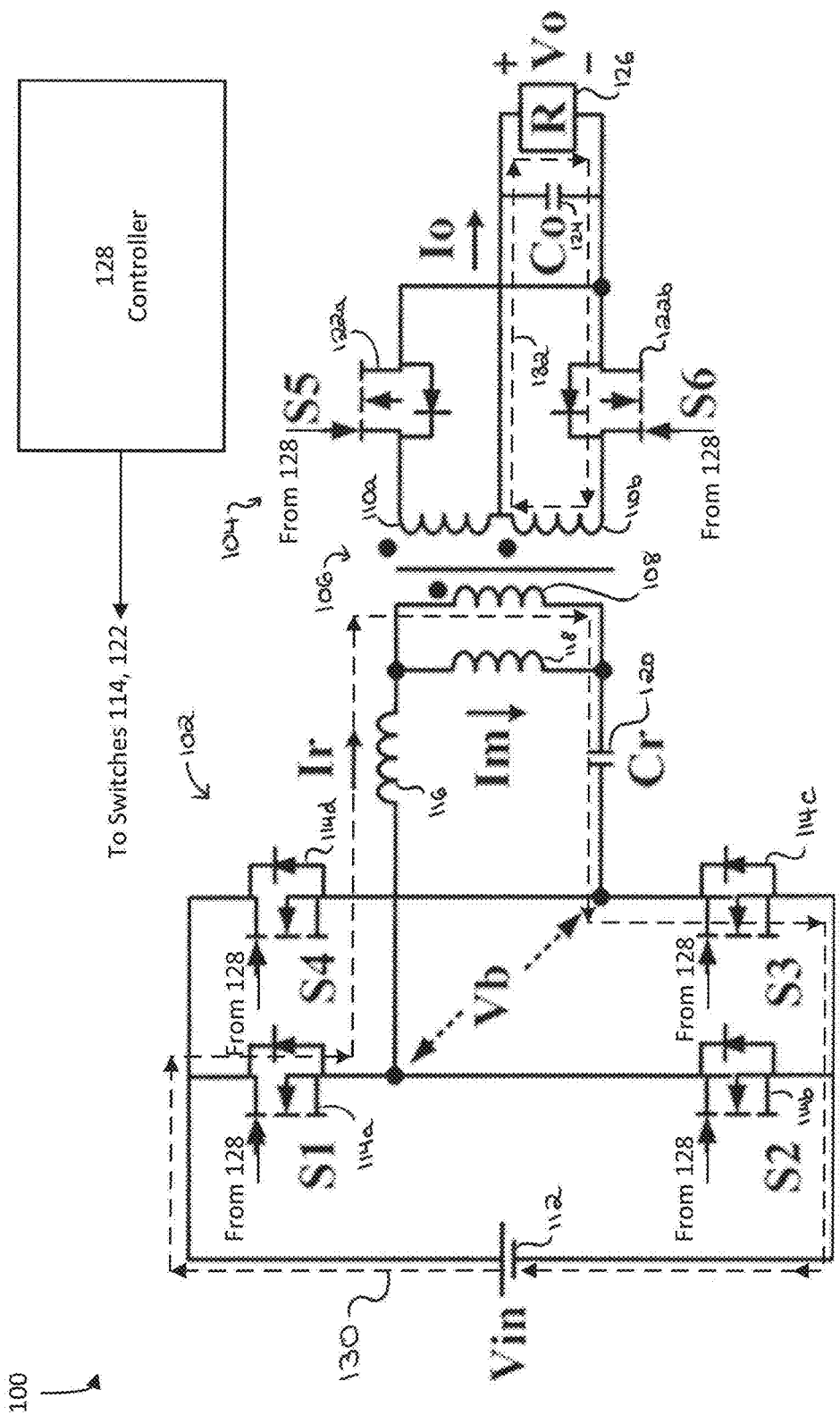
FIG. 1B illustrates a circuit diagram of the converter conducting a first current according to an example.

Accordingly, during the temporal overlap indicated by the phase angle 224, generally referred to as a first power cycle, the first switching device 114a, the third switching device 114c, and the sixth switching device 122b are controlled to be in a closed and conducting position. The energy source 112 is therefore enabled to provide a current indicated by the primary-side current trace 218 to a conductive path including the energy source 112, the first switching device 114a, the first inductor 116, the primary coil 108, the capacitor 120, and the third switching device 114c. FIG. 1B illustrates an example of the resonant converter 100 during the first power cycle, in which the primary-side circuit 102 of the resonant converter 100 conducts a first primary-side current 130, a value of which is indicated by the primary-side current trace 218, and the secondary-side circuit 104 of the resonant converter 100 conducts a first secondary-side current 132, a value of which is indicated by the secondary-side current trace 220.

The first primary-side current 130 is conducted by the primary coil 108, which induces a voltage across the first secondary coil 110a and the second secondary coil 110b. Because the sixth switching device 122b is in a closed and conducting position, the first secondary-side current 132 is induced in the secondary-side circuit 104 in a conductive path including the second secondary coil 110b, the capacitor 124, the load 126, and the sixth switching device 122b. The first secondary-side current 132 thus indicates a current including a first portion that is provided to the load 126, and a second portion that is provided to the capacitor 124, via the sixth switching device 122b.

At the end of the first power cycle, the third switching device 114c and the sixth switching device 122b are opened approximately simultaneously. Opening the sixth switching device 122b simultaneously with the third switching device 114c may be disadvantageous, at least because energy may still be stored in the transformer 106. The energy stored in the transformer 106 cannot be efficiently output to the load 126 if the sixth switching device 122b is in an open position. As indicated by the secondary-side current trace 220, the first secondary-side current 132 persists after the switching devices 114c, 122b are opened as the transformer 106 discharges stored energy. However, the first secondary-side current 132 may be inefficiently discharged to the load 126 if the sixth switching device 122b is in an open and non-conducting position. For example, the output current may follow an inefficient discharge path including the intrinsic parallel-connected diode of the sixth switching device 122*b*. Thus, if the sixth switching device 122*b* is opened before the transformer 106 fully discharges, the efficiency of the resonant converter 100 may be disadvantageously lowered, at least due to electrical losses in the intrinsic parallel-connected diode of the sixth switching device 122*b*.

Figure 1C:
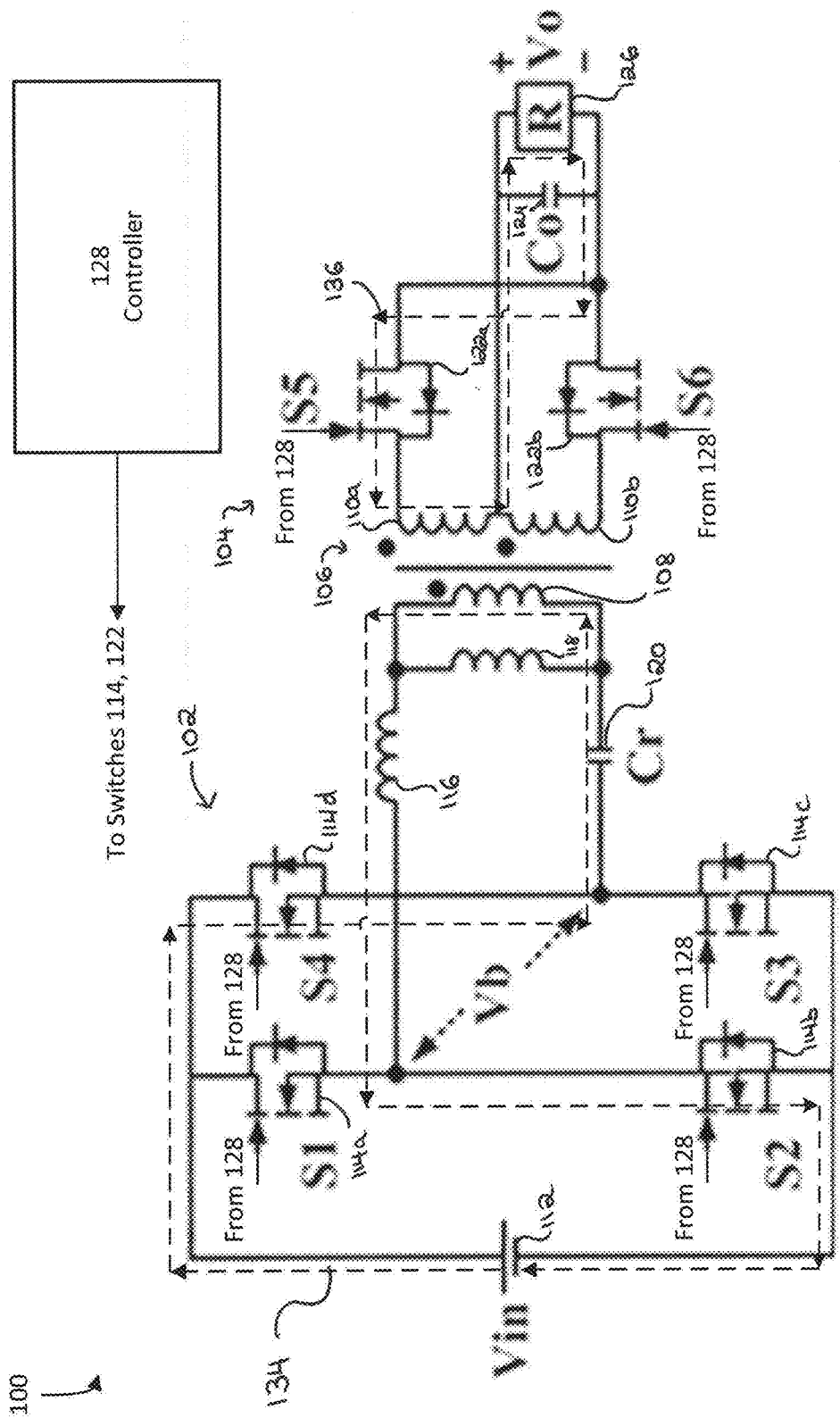
FIG. 1C illustrates a circuit diagram of the converter conducting a second current according to an example.

FIG. 1C illustrates an example of the resonant converter 100 during a second power cycle. In the second power cycle, not illustrated by the timing diagram 200*b*, the second switching device 114*b*, the fourth switching device 114*d*, and the fifth switching device 122*a* are controlled to be in a closed and conducting position. The energy source 112 discharges power to a conductive path including the energy source 112, the second switching device 114*b*, the first inductor 116, the primary coil 108, the capacitor 120, and the fourth switching device 114*d*.

A second primary-side current 134 is conducted by the primary coil 108, which induces a voltage across the first secondary coil 110*a* and the second secondary coil 110*b*. Because the fifth switching device 122*a* is in a closed and conducting position, a second secondary-side current 136 is induced in the secondary-side circuit 104 in a conductive path including the first secondary coil 110*a*, the capacitor 124, the load 126, and the fifth switching device 122*a*.

At the end of the second power cycle, the fourth switching device 114*d* may be opened. The fifth switching device 122*a* may be opened simultaneously with the fourth switching device 114*d*. Opening the fifth switching device 122*a* simultaneously with the fourth switching device 114*d* may be disadvantageous, at least because energy may still be stored in the transformer 106. The energy stored in the transformer 106 cannot be efficiently output to the load 126 if the fifth switching device 122*a* is in an open position. Thus, if the fifth switching device 122*a* is opened before the transformer 106 fully discharges, the efficiency of the resonant converter 100 may be disadvantageously lowered.

Figure 2C:
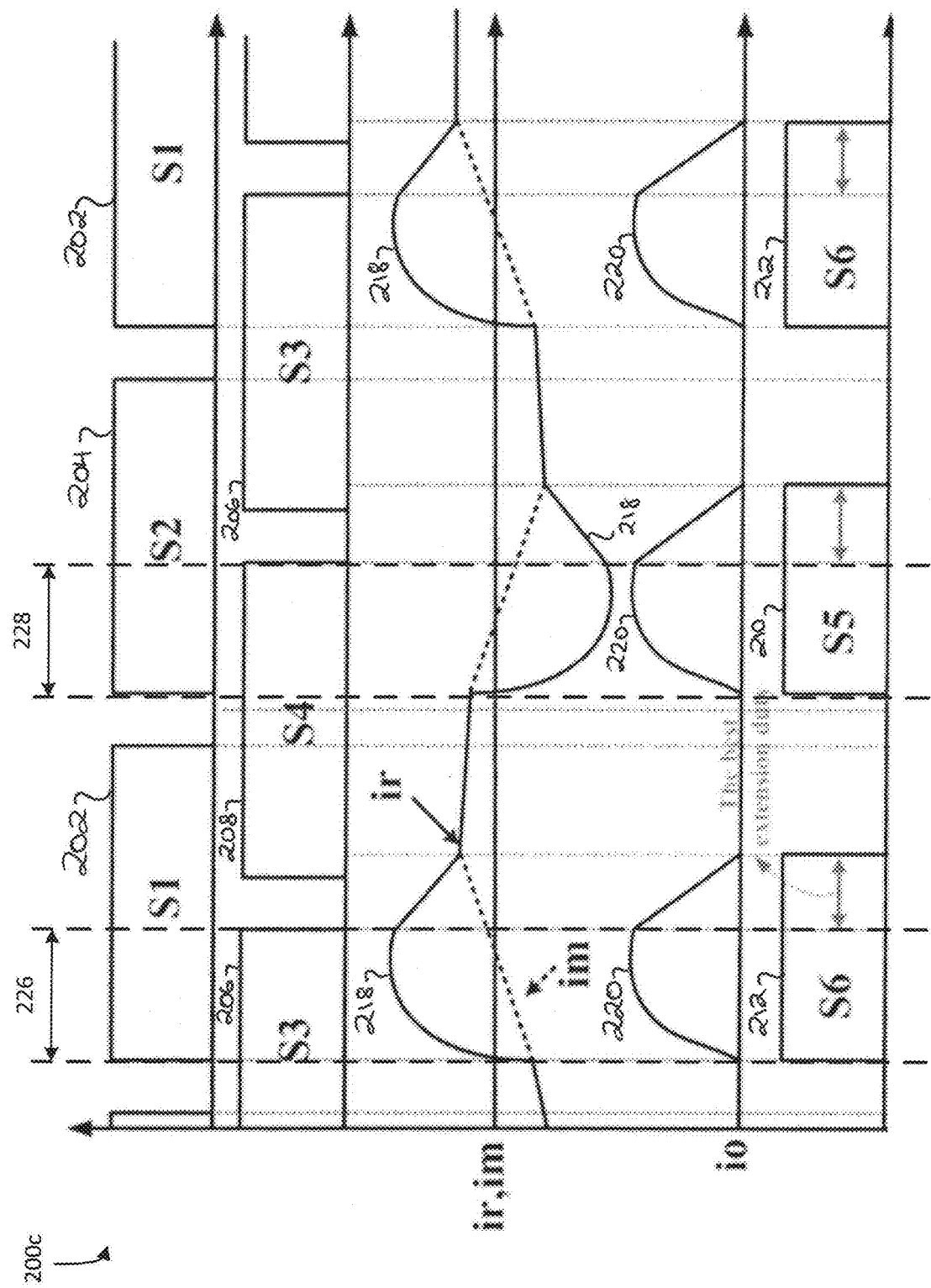
FIG. 2C illustrates a third timing diagram according to an example.

In light of the foregoing deficiencies, it may be advantageous to extend a respective duty cycle of the switching devices 122 to enable the transformer 106 to discharge stored energy more efficiently. For example, FIG. 2C illustrates a timing diagram 200*c* illustrating an advantageous duty cycle of the switching devices 122. As illustrated by the sixth PWM signal 212, the duty cycle of the sixth switching device 122*b* is extended until the output current is approximately zero, rather than transitioning to a logical LOW level simultaneously with the third PWM signal 206. Similarly, as illustrated by the fifth PWM signal 210, the duty cycle of the fifth switching device 122*a* is extended until the output current is approximately zero, rather than transitioning to a logical LOW level simultaneously with the fourth PWM signal 208.

Accordingly, it may be advantageous to extend the duty cycles of the switching devices 122, relative to prior solutions, in a manner illustrated by FIG. 2C. Two examples of implementing the extended duty cycles are provided. In a first example, a circuit is implemented to determine the output current provided to the load 126 and, responsive to determining that the output current is below a selected current value, the switching devices 122 are opened. In a second example, a control method is implemented to determine a parameter indicative of an optimal duty cycle of the switching devices 122. For example, the parameter may be a phase angle indicative of an overlap between the phases of the switching devices 114*a*, 114*c* or an overlap between the phases of the switching devices 114*b*, 114*d*. The parameter is analyzed by the controller 128 to determine an optimal duty cycle of the switching devices 122, pursuant to which the switching devices 122 are controlled.

Figure 3:
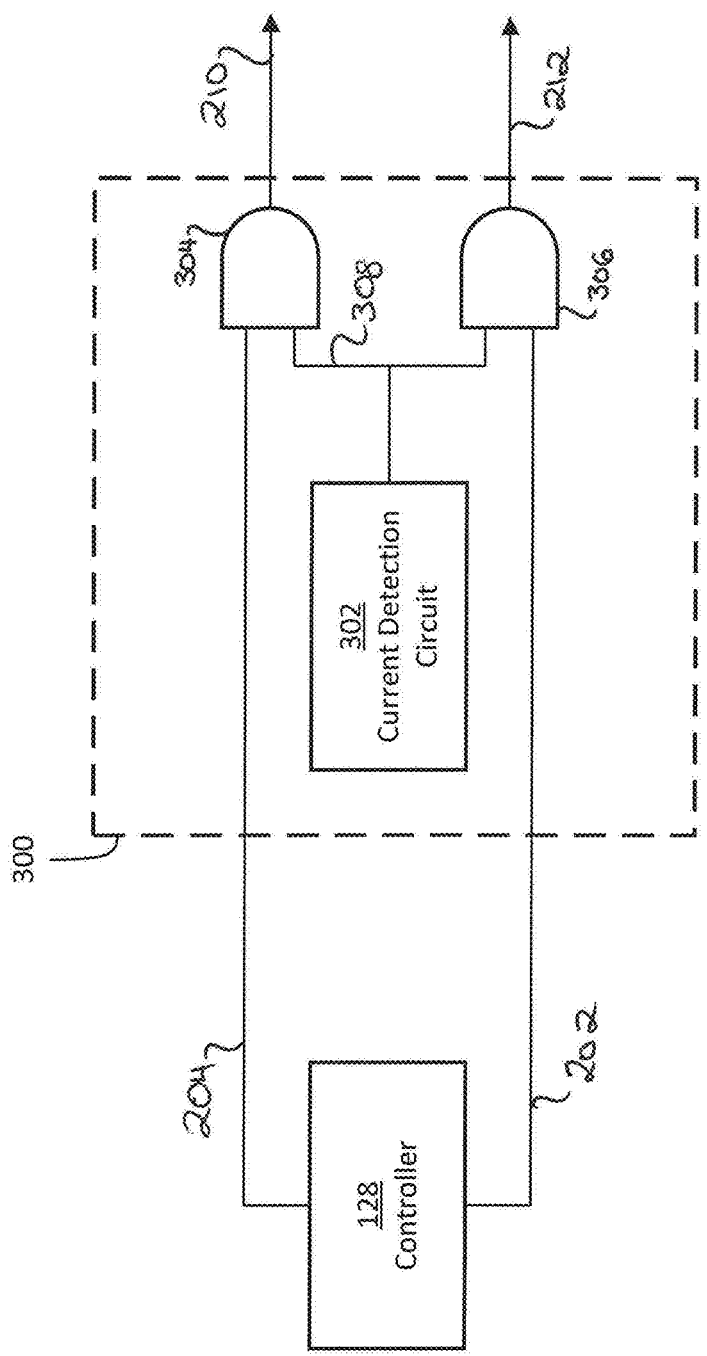
FIG. 3 illustrates a schematic diagram of a converter control circuit according to an example.

The first example of implementing the extended duty cycle discussed above will now be discussed in greater detail. FIG. 3 illustrates a schematic diagram of a converter control circuit 300. The converter control circuit 300 includes a current detection circuit 302, a first logic gate 304, and a second logic gate 306. In one example, the converter control circuit 300 is configured to receive the first PWM signal 202 and the second PWM signal 204 from the controller 128, and is configured to provide the fifth PWM signal 210 and the sixth PWM signal 212 to the fifth switching device 122*a* and the sixth switching device 122*b*, respectively. In another example, the converter control circuit 300 may include, or be included by, the controller 128.

The current detection circuit 302 is configured to detect an output current provided to the load 126 (for example, the first secondary-side current 132 or the second secondary-side current 134) and output, based on the output current, a current detection signal 308 to the logic gates 304, 306. As discussed in greater detail below, the current detection signal 308 may be a square wave having a first value (for example, a logical LOW level) where the output current is below a selected current value, and a second value (for example, a logical HIGH level) where the output current is above the selected current value. For example, the output current may be below the selected current value where the transformer 106 has been approximately fully discharged, and the output current may be above the selected current value where the transformer 106 is still discharging.

The first logic gate 304 is configured to receive the second PWM signal 204 and the current detection signal 308, and the second logic gate 306 is configured to receive the first PWM signal 202 and the current detection signal 308. The first logic gate 304 is configured to output the fifth PWM signal 210 based on the second PWM signal 204 and the current detection signal 308, and the second logic gate 306 is configured to output the sixth PWM signal 212 based on the first PWM signal 202 and the current detection signal 308.

In one example, the first logic gate 304 and the second logic gate 306 are AND gates. In this example, therefore, the first logic gate 304 is configured to output the fifth PWM signal 210 at a logical HIGH level when the current detection signal 308 and the second PWM signal 204 are simultaneously at a logical HIGH level, and is configured to output the fifth PWM signal 210 at a logical LOW level when either or both of the current detection signal 308 and the second PWM signal 204 are at a logical LOW level. Similarly, the second logic gate 306 is configured to output the sixth PWM signal 212 at a logical HIGH level when the current detection signal 308 and the first PWM signal 202 are at a logical HIGH level, and is configured to output the sixth PWM signal 212 at a logical LOW level when either or both of the current detection signal 308 and the first PWM signal 202 are at a logical LOW level.

Figure 4:
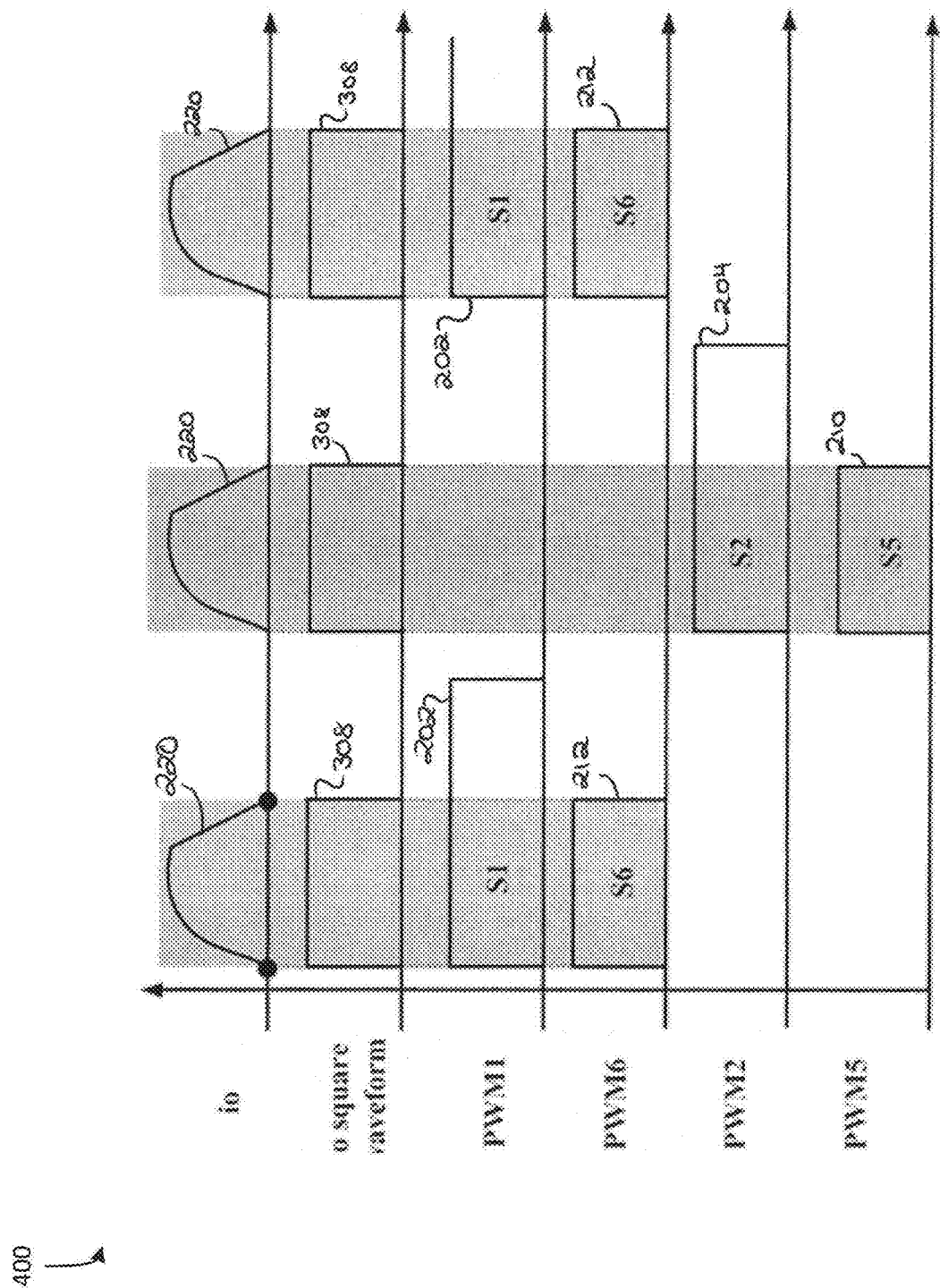
FIG. 4 illustrates a fourth timing diagram according to an example.

Thus, in this example, the fifth PWM signal 210 may be at a logical HIGH level where the second PWM signal 204 is at a logical HIGH level and the output current provided to the load 126 is above a selected current value (for example, a value corresponding to a situation in which the transformer 106 is still discharging), and the sixth PWM signal 212 is at a logical HIGH level where the first PWM signal 202 is at a logical HIGH level and the output current provided to the load 126 is above a selected current value. FIG. 4 illustrates a timing diagram 400 according to this example, in which the current detection signal 308 is generated having a first value indicative of an output current above a selected current value, the output current being indicated by the secondary-side current trace 220, and having a second value indicative of an output current below the selected current value. For example, the first value indicative of the output current above the selected current value may be a logical HIGH value, and the second value indicative of the output current being below the selected current value may be a logical LOW value, as illustrated by FIG. 4. Thus, in contrast to prior implementations, the fifth PWM signal 210 is not dependent upon a state of the fourth PWM signal 208, and the sixth PWM signal 212 is not dependent upon a state of the third PWM signal 206.

As discussed above, the current detection circuit 302 is configured to detect an output current provided to the load 126 and output, based on the output current, the current detection signal 308 to the logic gates 304, 306. The current detection circuit 302 may include, or be otherwise communicatively coupled to, one or more sensors configured to sense parameters indicative of the output current provided to the load 126. For example, the current detection circuit 302 and/or the controller 128 may include, or be otherwise communicatively coupled to, one or more ammeters and/or voltmeters configured to sense a current or voltage, respectively, indicative of the output current provided to the load 126. As discussed above, the current detection circuit 302 is further configured to output the current detection signal 308 having a first value where the output current determined by the current detection circuit 302 is below a selected current value, and a second value where the output current determined by the current detection circuit 302 is above the selected current value.

The second example of implementing the extended duty cycle will now be discussed in greater detail. The second example includes a control method which may be implemented to determine a parameter indicative of an optimal duty cycle of the switching devices 122, rather than determining the output current. A parameter indicative of the optimal duty cycle may be a phase angle indicative of an overlap between the first PWM signal 202 and the third PWM signal 206 and/or the second PWM signal 204 and the fourth PWM signal 208.

For example, and with reference to FIG. 2C, a first phase angle 226 may include an overlap between the first PWM signal 202 and the third PWM signal 206. The first phase angle 226 may be analyzed to determine an optimal duty cycle of the sixth PWM signal 212. Similarly, a second phase angle 228 may include an overlap between the second PWM signal 204 and the fourth PWM signal 208. The second phase angle 228 may be analyzed to determine an optimal duty cycle of the fifth PWM signal 210.

Figure 5:
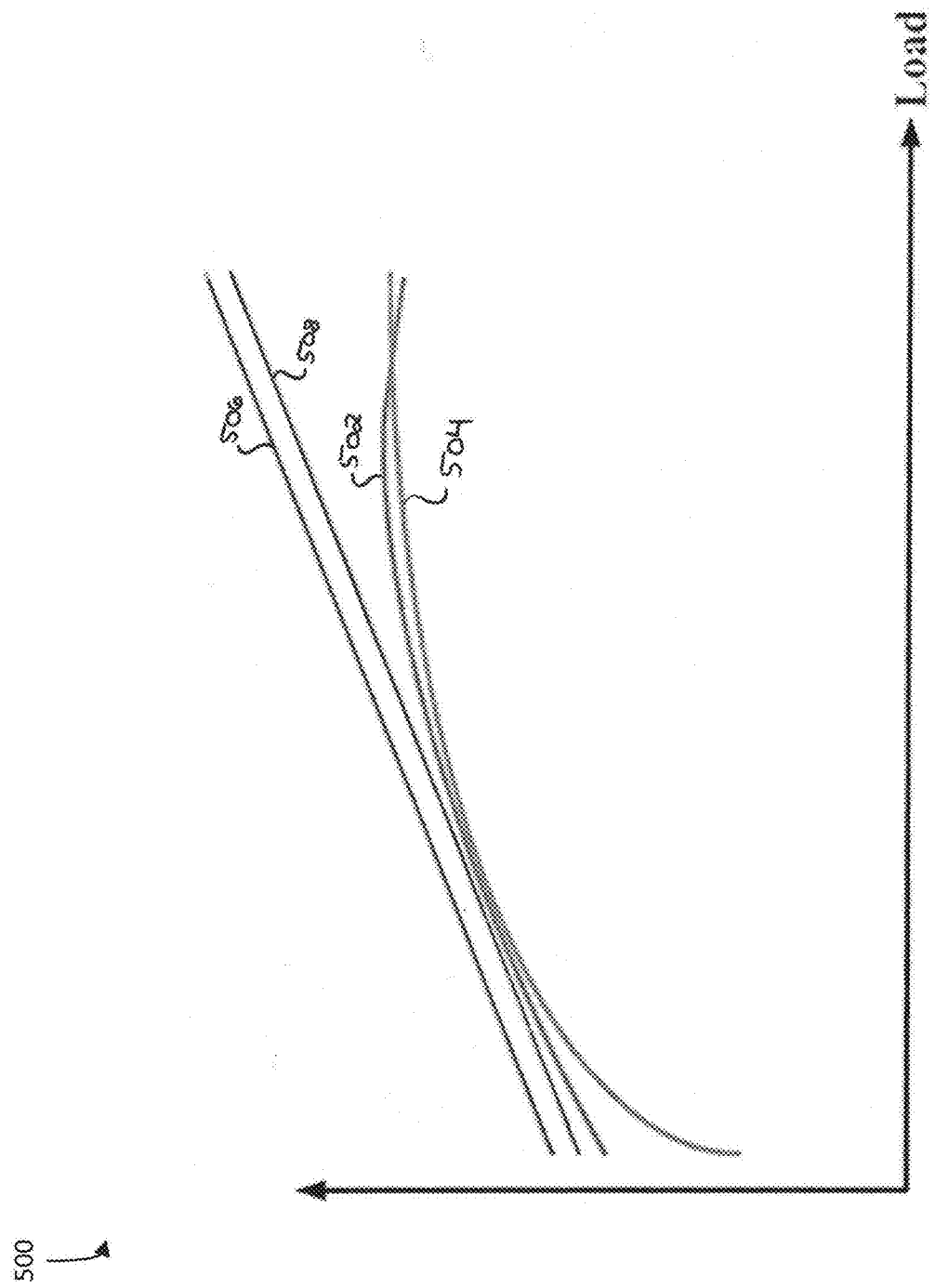
FIG. 5 illustrates a graph depicting a relationship between a phase angle and an optimal duty cycle according to an example.

FIG. 5 illustrates a graph 500 depicting a relationship between a phase angle (for example, the first phase angle 226 or the second phase angle 228) and an optimal duty cycle (for example, of the fifth PWM signal 210 or the sixth PWM signal 212). The graph 500 includes an optimal duty cycle trace 502, a phase angle trace 504, an input current trace 506, and an output current trace 508. The optimal duty cycle trace 502 is indicative of an optimal phase by which to extend the fifth PWM signal 210 and/or the sixth PWM signal 212 beyond a falling edge of the third PWM signal 206 and/or a falling edge of the fourth PWM signal 208. The phase angle trace 504 is indicative of the first phase angle 226 (for example, where the optimal duty cycle trace 502 is indicative of the sixth PWM signal 212) and/or the second phase angle 228 (for example, where the optimal duty cycle trace 502 is indicative of the fifth PWM signal 210). The input current trace 506 is indicative of a current received from the energy source 112 (for example, the first primary-side current 130 or the second primary-side current 134). The output current trace 508 is indicative of an output current, a portion of which is provided to the load 126 (for example, the first secondary-side current 132 or the second secondary-side current 136).

As indicated by the graph 500, a relationship between the optimal duty cycle trace 502 and the phase angle trace 504 varies as the output current trace 508 increases, indicative of the load 126 increasing and thereby drawing more output current. Accordingly, in determining the optimal duty cycle trace 502 based on the phase angle trace 504, the optimal duty cycle trace 502 and the phase angle trace 504 may be divided into several sections, each section corresponding to a respective relationship between the optimal duty cycle trace 502 and the phase angle trace 504.

Figure 6:
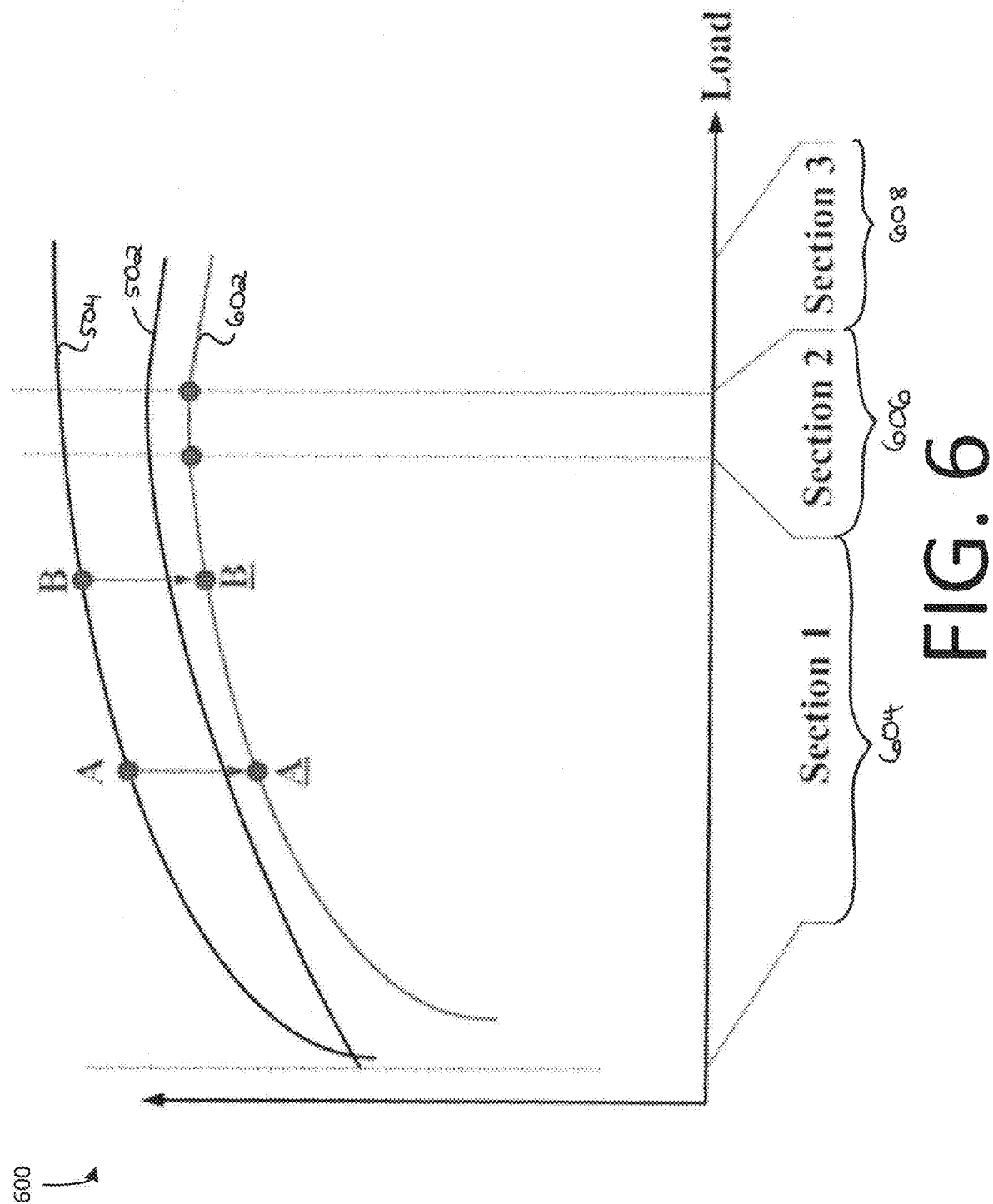
FIG. 6 illustrates a graph depicting a relationship between a phase angle, an optimal duty cycle, and a selected duty cycle according to an example.

FIG. 6 illustrates a graph 600 depicting a relationship between a phase angle, an optimal duty cycle, and a selected duty cycle. The graph 600 includes the optimal duty cycle trace 502, the phase angle trace 504, and a selected duty cycle trace 602. The selected duty cycle trace 602 is indicative of a selected duty cycle that is determined by the controller 128 and actually provided by the controller 128 to one of the switching devices 122.

As discussed above, the optimal duty cycle trace 502 is indicative of an ideal duty cycle. However, it may be computationally infeasible or undesirable to precisely calculate the optimal duty cycle trace 502 in some examples. Accordingly, rather than directly determining the optimal duty cycle trace 502 from the phase angle trace 504, the selected duty cycle trace 602 may be determined based on the phase angle trace 504 as an approximation of the optimal duty cycle trace 502.

The graph 600 is divided into a first section 604, a second section 606, and a third section 608. Each section corresponds to a respective relationship between the phase angle trace 504 and the optimal duty cycle trace 502 and the selected duty cycle trace 602. In the first section 604, the optimal duty cycle trace 502 and the selected duty cycle 602 increase as the output current provided to the load 126 increases. In the second section 606, the optimal duty cycle trace 502 and the selected duty cycle trace 602 are approximately constant. In the third section 608, the optimal duty cycle trace 502 and the selected duty cycle trace 602 decrease as the output current provided to the load 126 increases.

A method of determining a selected duty cycle trace based on the phase angle trace 504 varies for each section. In the first section 604, the selected duty cycle trace 602 is determined by multiplying the phase angle trace 504 by a first constant value. In the second section 606, the selected duty cycle trace 602 is determined to be set to a second constant value. In the third section 608, the selected duty cycle trace 602 is determined by multiplying the phase angle trace 504 by a third constant value.

The first, second, and third constant values may be stored in storage accessible to the controller 128. For example, the first and third constant values may be determined experimentally by identifying constant values that, when multiplied by the phase angle trace 504, yields a selected duty cycle that most accurately represents the optimal duty cycle trace 502. The second constant value may be determined experimentally by determining a constant value that most accurately represents the optimal duty cycle trace 502.

Figure 7:
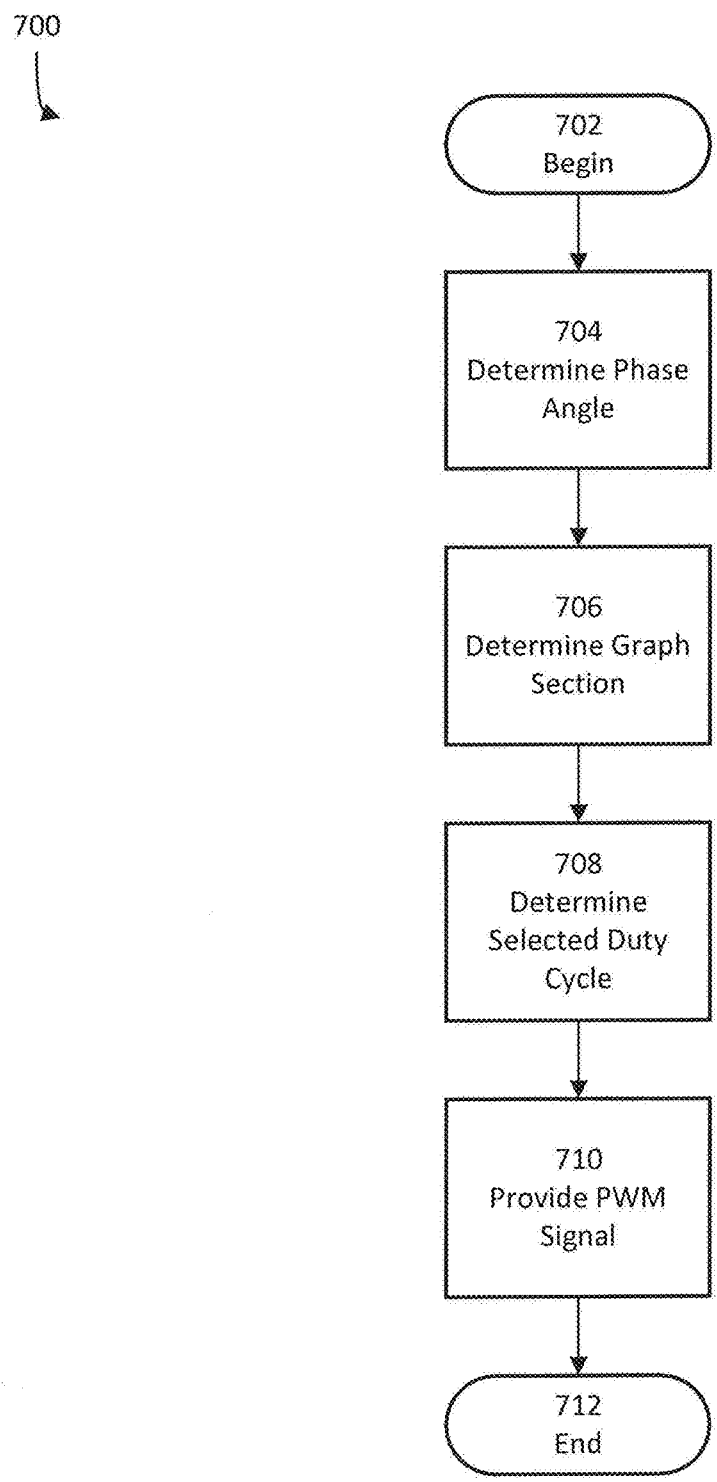
FIG. 7 illustrates a process of controlling a converter according to an example.

FIG. 7 illustrates a process 700 of determining the selected duty cycle indicated by the selected duty cycle trace 602 based on the phase angle indicated by the phase angle trace 504. The process 700 may be executed by the controller 128. The process 700 includes acts of determining a phase angle, determining a section of the graph 600 to which the phase angle corresponds, determining a selected duty cycle, and providing a PWM signal with the selected duty cycle to a switching device.

At act 702, the process 700 begins. At act 704, a phase angle is determined. As discussed above, the first phase angle 226 may correspond to an overlap between the first PWM signal 202 and the third PWM signal 206 provided by the controller 128, and the second phase angle 228 may correspond to an overlap between the second PWM signal 204 and the fourth PWM signal 208 provided by the controller 128. Accordingly, the controller 128 may determine the phase angle at act 704 by determining a phase overlap between the signals 202, 206 and/or the signals 204, 208.

At act 706, a section of the graph 600 to which the phase angle corresponds is determined. The controller 128 may determine where the phase angle determined at act 704 is along the phase angle trace 504 and, based on the determination, determine which of the sections 604-608 the phase angle corresponds to. As discussed above, each of the sections 604-608 correspond to a respective range of phase angle values.

At act 708, a selected duty cycle is determined based on a section of the graph 600 to which the phase angle corresponds. For example, if the phase angle corresponds to the first section 604, then the phase angle determined at act 704 may be multiplied by the first constant value to determine the selected duty cycle. If the phase angle corresponds to the second section 606, then the selected duty cycle may be set to the second constant value. If the phase angle corresponds to the third section 608, then the phase angle may be multiplied by the third constant value to determine the selected duty cycle.

At 710, a PWM signal is provided to a switching device based on the selected duty cycle. For example, where the phase angle is the first phase angle 226, then the selected duty cycle is used to determine the sixth PWM signal 212. More particularly, the sixth PWM signal 212 may be generated by extending the first phase angle 226 by the selected duty cycle. Similarly, where the phase angle is the second phase angle 228, the fifth PWM signal 210 is determined by extending the second phase angle 228 by the selected duty cycle. The fifth PWM signal 210 and/or the sixth PWM signal 212 are provided to the switching devices 122a, 122b, respectively. At act 712, the process 700 ends.

The process 700 may be repeatedly executed by the controller 128. For example, the controller 128 may execute the process 700 at a specific frequency (for example, 80 kHz). Thus, the phase angles 226, 228 may be repeatedly re-evaluated to determine the PWM signals 210, 212 and thereby maximize an efficiency of the resonant converter 100.

Although the PWM signals 210, 212 have been determined based on the phase angles 226, 228 in the foregoing examples, in other embodiments, other parameters may be analyzed to determine the PWM signals 210, 212. For example, the controller 128 may determine the PWM signals 210, 212 based on the input current provided by the energy source 112, a current in the primary coil 108 or the secondary coils 110, the output current provided to the load 126, or any other parameter related to the duty cycle of the PWM signals 210, 212.

As discussed above, the current detection circuit 302 is configured to determine a current value and determine whether the current value is below a selected current value corresponding to an energy level of the transformer 106. In some examples, the selected current value may be selected by a user, such as a designer of the resonant converter 100 or an end user of the resonant converter 100. In other examples, the current detection circuit 302 and/or the controller 128 (which may include the current detection circuit 302) may determine the selected current value dynamically. In various examples, the selected current value may be zero, or may be greater than zero.

Accordingly, examples have been provided in which a switching device configured to control an output current is controlled based on an energy storage device, such as a secondary coil of a transformer, being substantially discharged. An energy level of the energy storage device may be determined by determining a parameter indicative of the energy level of the energy storage device. In one example, the parameter indicative of the energy level includes the output current provided to the load. The output current is measured and the switching device is opened responsive to determining that a value of the output current is below a selected current value threshold, where the selected current value threshold corresponds to an energy storage device discharge energy level. In another example, the parameter indicative of the energy level of the energy storage device includes a phase angle between a plurality of switching devices controlling an input current. An optimal duty cycle of the switching device is determined based on the phase angle between the plurality of switching devices, thereby controlling a discharge of the energy storage device. In these examples, although an energy level of the energy storage device is not directly measured, the energy level of the energy storage device may be determined based on other parameters to control the switching device. For example, an energy level of the energy storage device may be determined such that the switching device may be opened responsive to determining that the energy level is below a discharge energy level corresponding to the energy storage device being substantially discharged.

Having thus described several aspects of at least one embodiment, it is to be appreciated various alterations, modifications, and improvements will readily occur to those skilled in the art. Such alterations, modifications, and improvements are intended to be part of, and within the spirit and scope of, this disclosure. Accordingly, the foregoing description and drawings are by way of example only.

What is claimed is:

1. A converter system including:
    a primary-side circuit configured to be coupled to an energy source and having a plurality of switching devices configured to control an input current received from the energy source;
    a secondary-side circuit configured to be coupled to a load, the secondary-side circuit including an energy storage device and at least one switching device configured to control a load current provided by the energy storage device to the load; and
    a controller configured to be coupled to the primary-side circuit and the secondary-side circuit, the controller being further configured to:
        determine a phase angle between the plurality of switching devices; and
        control, based on the phase angle between the plurality of switching devices indicating that the energy level of the energy storage device is below a discharge energy level, the at least one switching device to be in an open and non-conducting position.

2. The converter system of claim 1, further comprising a transformer having a primary coil coupled to the primary-side circuit and at least one secondary coil coupled to the secondary-side circuit, wherein the energy storage device includes the at least one secondary coil.

3. The converter system of claim 2, wherein the at least one secondary coil is configured to provide an output current including the load current.

4. The converter system of claim 2, further comprising a current: detection circuit configured to detect a value of an output current provided by the at least one secondary coil.

5. The converter system of claim 2, wherein the controller is further configured to:
   determine whether a value of an output current is below a current value corresponding to the discharge energy level of the energy storage device; and
   control the at least one switching device to be in the open and non-conducting position responsive to determining that the value of the output current is below the current value corresponding to the discharge energy level of the energy storage device.

6. The converter system of claim 2, wherein the plurality of switching devices are configured to control the input current through the primary coil.

7. The converter system of claim 1, wherein the controller is further configured to:
   determine a duty cycle of the at least one switching device based on the phase angle between the plurality of switching devices.

8. A non-transitory computer-readable medium storing thereon sequences of computer-executable instructions for controlling a converter system having a primary-side circuit including a plurality of switching devices configured to control an input current received from an energy source, a secondary-side circuit, an energy storage device, and at least one switching device configured to control a load current provided by the energy storage device to a load, the sequences of computer-executable instructions including instructions that instruct at least one processor to:
   determine a phase angle between the plurality of switching devices; and
   control, based on the phase angle between the plurality of switching devices indicating that the energy level of the energy storage device is below a discharge energy level, the at least one switching device to be in an open and non-conducting position.

9. The non-transitory computer-readable medium of claim 8, wherein the converter system further comprises a transformer having a primary coil coupled to the primary-side circuit and at least one secondary coil coupled to the secondary-side circuit, the energy storage device including the at least one secondary coil, and the at least one secondary coil being configured to provide an output current including the load current, and wherein the instructions further instruct the at least one processor to detect a value of the output current provided by the at least one secondary coil.

10. The non-transitory computer-readable medium of claim 8, wherein the instructions are further configured to instruct the at least one processor to:
   determine whether a value of an output current is below a current value corresponding to the discharge energy level of the energy storage device; and
   control the at least one switching device to be in the open and non-conducting position responsive to determining that the value of the output current is below the current value corresponding to the discharge energy level of the energy storage device.

11. The non-transitory computer-readable medium of claim 8, wherein the converter system further comprises a transformer having a primary coil and at least one secondary coil, the plurality of switching devices being configured to control the input current through the primary coil, and the at least one secondary coil being coupled to the secondary-side circuit, and wherein the instructions further instruct the at least one processor to:
   determine a duty cycle of the at least one switching device based on the phase angle between the plurality of switching devices.

12. A method of controlling a converter system having a primary-side circuit including a plurality of switching devices configured to control an input current received from an energy source, a secondary-side circuit, an energy storage device, and at least one switching device configured to control a load current provided by the energy storage device to a load, the method comprising:
   determining a phase angle between the plurality of switching devices; and
   controlling, based on the phase angle between the plurality of switching devices indicating that the energy level of the energy storage device is below a discharge energy level, the at least one switching device to be in an open and non-conducting position.

13. The method of claim 12, wherein the converter system further comprises a transformer having a primary coil coupled to the primary-side circuit and at least one secondary coil coupled to the secondary-side circuit, the energy storage device including the at least one secondary coil, and the at least one secondary coil being configured to provide an output current including the load current, and wherein the method further comprises detecting a value of the output current provided by the at least one secondary coil.

14. The method of claim 12, further comprising:
   determining whether a value of an output current is below a current value corresponding to the discharge energy level of the energy storage device; and
   controlling the at least one switching device to be in the open and non-conducting position responsive to determining that the value of the output current is below the current value corresponding to the discharge energy level of the energy storage device.

15. The method of claim 12, wherein the converter system further comprises a transformer having a primary coil and at least one secondary coil, the plurality of switching devices being configured to control the input current through the primary coil, and the at least one secondary coil being coupled to the secondary-side circuit, and wherein the method further comprises:
   determining a duty cycle of the at least one switching device based on the phase angle between the plurality of switching devices.

* * * * *